(12) United States Patent
Pace et al.

(10) Patent No.: US 8,655,163 B2
(45) Date of Patent: Feb. 18, 2014

(54) CONSOLIDATED 2D/3D CAMERA

(75) Inventors: Vincent Pace, Shadow Hills, CA (US);
James Cameron, Malibu, CA (US);
Patrick Campbell, Stevenson Ranch, CA (US)

(73) Assignee: Cameron Pace Group LLC, Burbank, CA (US)

( * ) Notice: Subject to any disclaimer, the term of this patent is extended or adjusted under 35 U.S.C. 154(b) by 153 days.

(21) Appl. No.: 13/372,323

(22) Filed: Feb. 13, 2012

(65) Prior Publication Data

US 2013/0209082 A1   Aug. 15, 2013

(51) Int. Cl.
*G03B 41/00* (2006.01)
*G03B 35/00* (2006.01)

(52) U.S. Cl.
USPC ............................ 396/322; 396/323; 396/324

(58) Field of Classification Search
USPC ................ 396/322–324; 348/47–48; 359/462
See application file for complete search history.

(56) References Cited

U.S. PATENT DOCUMENTS

| | | | |
|---|---|---|---|
| 3,990,087 A | 11/1976 | Marks | |
| 4,155,100 A | 5/1979 | Hill, Jr. | |
| 4,557,570 A | 12/1985 | Hines | |
| 4,650,305 A | 3/1987 | Hines | |
| 4,725,863 A | 2/1988 | Dumbreck et al. | |
| 4,751,570 A | 6/1988 | Robinson | |
| 4,811,093 A | 3/1989 | Giacometti | |
| 4,881,122 A | 11/1989 | Murakami | |
| 4,999,713 A | 3/1991 | Ueno et al. | |
| 5,175,616 A | 12/1992 | Milgram | |
| 5,465,128 A | 11/1995 | Wah Lo et al. | |
| 5,532,777 A | 7/1996 | Zanen | |
| 5,699,108 A | 12/1997 | Katayama et al. | |
| 5,737,655 A | 4/1998 | Inaba | |
| 5,740,337 A | 4/1998 | Okino et al. | |
| 5,801,760 A * | 9/1998 | Uomori | 348/47 |
| 5,864,360 A | 1/1999 | Okauchi et al. | |
| 5,974,272 A | 10/1999 | Kiesow et al. | |
| 5,978,015 A | 11/1999 | Ishibashi et al. | |
| 6,160,607 A | 12/2000 | Diaconu | |
| 6,292,634 B1 | 9/2001 | Inaba | |
| 6,326,994 B1 | 12/2001 | Yoshimatsu | |
| 6,388,666 B1 | 5/2002 | Murray | |
| 6,414,709 B1 | 7/2002 | Palm et al. | |
| 6,466,746 B2 * | 10/2002 | Inaba | 396/326 |
| 6,512,892 B1 | 1/2003 | Montgomery et al. | |
| 6,701,081 B1 | 3/2004 | Dwyer et al. | |
| 6,798,406 B1 | 9/2004 | Jones et al. | |
| 6,909,457 B1 | 6/2005 | Fukasawa | |
| 7,031,512 B2 | 4/2006 | Ng | |
| 7,193,645 B1 | 3/2007 | Aagaard | |
| 7,424,218 B2 * | 9/2008 | Baudisch et al. | 396/322 |
| 7,551,272 B2 | 6/2009 | Vodanovic | |
| 7,899,321 B2 | 3/2011 | Cameron et al. | |

(Continued)

*Primary Examiner* — Christopher Mahoney
(74) *Attorney, Agent, or Firm* — SoCal IP Law Group LLP; Steven C. Sereboff; John E. Gunther

(57) ABSTRACT

A consolidated 2D/3D camera system and method of operation. A consolidated 2D/3D camera system may include a first camera having a first lens and a second camera having a second lens. A 3D frame extractor may extract a first 3D image frame from an image captured by the first camera and extract a second 3D image frame from an image captured by the second camera to provide a stereo image pair. A 2D frame extractor may extract a 2D image frame, different from the first 3D image frame, from the image captured by the first camera.

24 Claims, 10 Drawing Sheets

(56) References Cited

U.S. PATENT DOCUMENTS

| | | |
|---|---|---|
| 2001/0056477 A1 | 12/2001 | McTernan et al. |
| 2002/0012043 A1 | 1/2002 | Guerin et al. |
| 2005/0041095 A1 | 2/2005 | Butler-Smith et al. |
| 2007/0103675 A1 | 5/2007 | Vodanovic |
| 2007/0146478 A1 | 6/2007 | Butler-Smith et al. |
| 2007/0247614 A1 | 10/2007 | Puah et al. |
| 2008/0007567 A1 | 1/2008 | Clatworthy et al. |
| 2008/0123938 A1 | 5/2008 | Kim |
| 2008/0158345 A1 | 7/2008 | Schklair |
| 2009/0262184 A1 | 10/2009 | Engle et al. |
| 2011/0255746 A1* | 10/2011 | Berkovich et al. ............ 382/103 |
| 2012/0113105 A1* | 5/2012 | Lee ............................... 345/419 |

* cited by examiner

CONSOLIDATED 2D/3D CAMERA

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on distant objects, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional (3D) imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique has been used to present 3D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Sporting events and other live broadcasts have traditionally been recorded and televised as 2D video images. Recently, such events have been recorded and televised in both 2D and 3D. It is generally not acceptable to simply use one channel of a 3D camera as a 2D video image since the preferred framing for 2D images is commonly not the same as the preferred framing for 3D images. For example, a tight framing (in which the primary subject fills a large portion of the image) may typically be used for a 2D camera and a wider framing may typically be used to emphasize the depth captured by a 3D camera. Thus when sporting events were recorded in both 2D and 3D, separate cameras and different camera operators were commonly used to capture the 2D and 3D video. However, the need for separate cameras and camera operators greatly increases the cost of recording an event. More recently, integrated 2D/3D cameras, as described in U.S. Pat. No. 7,929,852 B2, allow a single camera operator to capture both 2D and 3D video.

Throughout this description, elements appearing in schematic views and block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
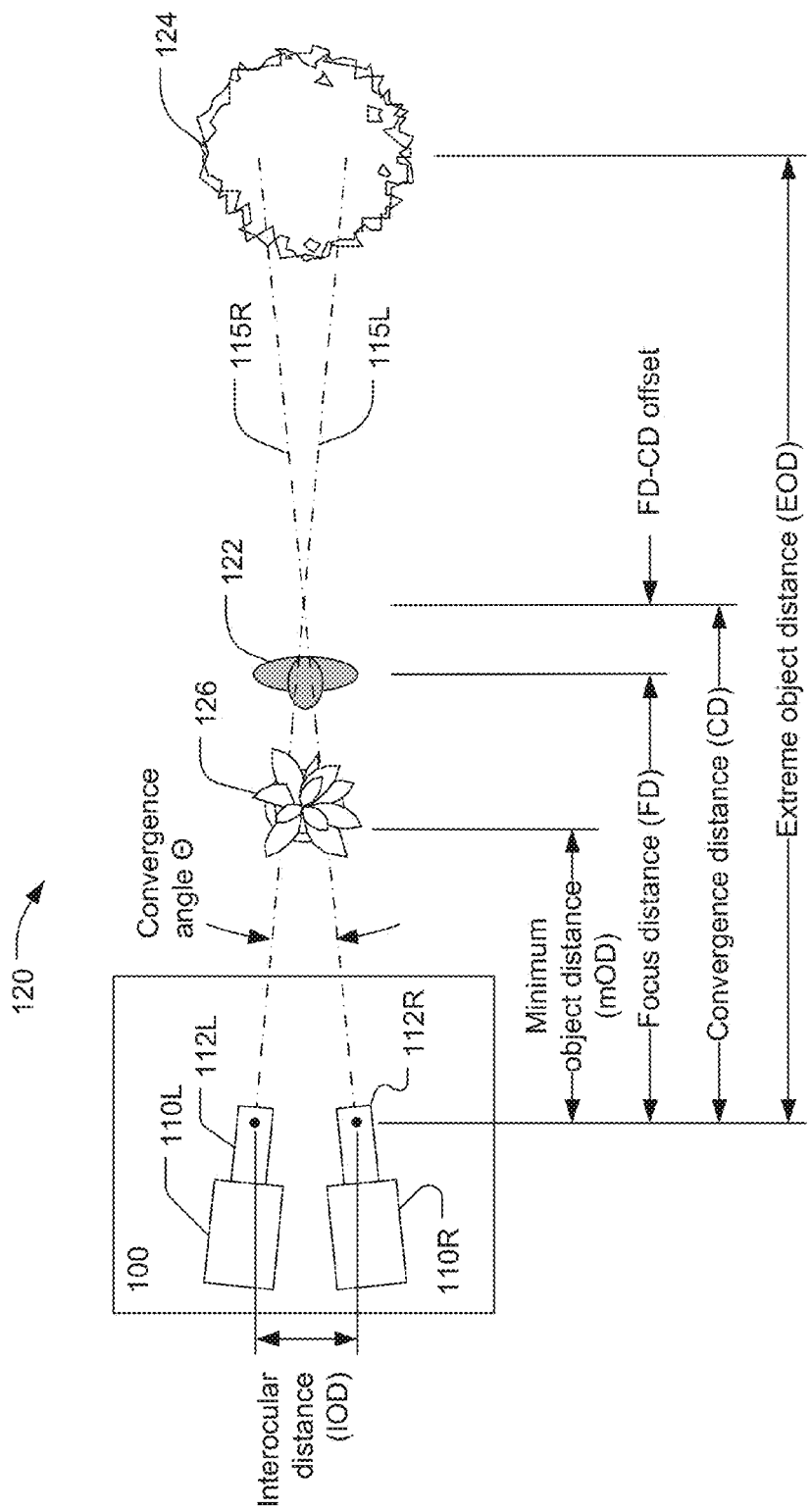
FIG. 1 is a schematic view of a stereographic camera in an environment.

Referring now to FIG. 1, a 3D, or stereographic, camera 100 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have a respective axis 115L, 115R that define the centers of the fields of view of the cameras 110L, 110R.

The left and right cameras 110L, 110R may be separated by an interocular distance IOD. The cameras 110L, 110R may be disposed such that the axes 115L, 115R are parallel or such that a convergence angle Θ is formed between the two axes 115L, 115R. The cameras 110L, 110R may be disposed such that the axes 115L, 115R cross at a convergence distance CD from the cameras. The interocular distance IOD, the convergence distance CD, and the convergence angle Θ are related by the formula $$\Theta = 2 A \, TAN(IOD/2CD), \text{ or} \quad (1)$$

$$C_S = IOD/[2 \, TAN(\Theta/2)]. \quad (2)$$

The interocular distance IOD and the convergence distance CD may be measured from a nodal point within the lenses 112L, 112R, which may be the center of an entrance pupil of each lens 112L, 112R.

The stereographic camera 100 may be used to form a stereographic image of a scene 120. As shown in the simplified example of FIG. 1, the scene 120 may include a primary subject 122 which is shown, for example, as a person. The scene 120 may also include other features and objects in the background (behind the primary subject 122) or the foreground (between the camera and the primary subject 122). When the images from a stereographic camera, such as the 3D camera 100, are displayed on a viewing screen, scene objects at the convergence distance will appear to be in the plane of the viewing screen. Scene objects, such as the primary subject 122 in the example of FIG. 1, located closer to the stereographic camera may appear to be in front of the viewing screen. Background scene objects, such as the tree 124, located further from the stereographic camera may appear to be behind the viewing screen. Foreground scene objects, such as the plant 126, located closer to the camera may appear to be further in front of the viewing screen.

Each lens 112L, 112R may have adjustable focus. The lenses 112L, 112R may be focused at a common adjustable focus distance FD. The focus distance FD may be adjusted manually or may be automatically adjusted. The focus distance FD may be adjusted such that the cameras 110L, 110R are focused on the primary subject 122. The focus distance may be automatically adjusted in response to a sensor (not shown) that determines the distance from the cameras 110L, 110R to the primary subject 122. The sensor to determine the distance from the cameras to the primary subject 122 may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 122. However, as shown in FIG. 1, the convergence distance CD and the focus distance FD may not be the same distance. For example, the focus distance FD may be set at the distance from the cameras to the primary subject and the convergence distance CD may be set slightly longer than the focus distance. In this case, when the images are displayed, the primary subject will be seen to be in front of the plane of the viewing screen.

Each lens 112L, 112R may also have zoom capability, which is to say that the focal length FL of each lens may be adjusted. The focal lengths of the lenses 112L, 112R may be adjusted manually or automatically. The focal lengths of the lenses 112L, 112R may be adjusted synchronously such that focal lengths of the lenses are precisely the same at all times. The focal lengths of the lenses 112L, 112R may be adjustable over a predetermined continuous range of focal lengths.

A distance from the camera to the closest foreground object, which may be the plant 126, may be defined as the minimum object distance mOD. A distance from the camera to the furthest object 124 in the scene 120 may be defined as the extreme object distance EOD.

Figure 2:
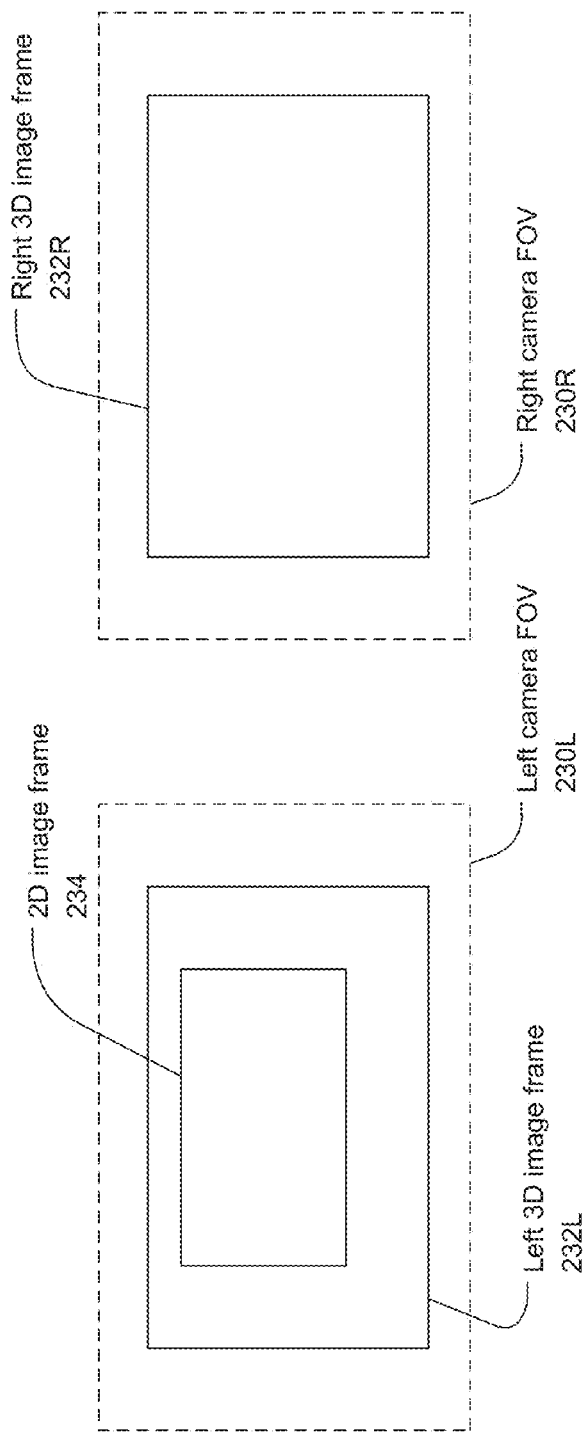
FIG. 2 is a graphical representation of the fields of view of two cameras.

FIG. 2 is a graphical representation of the fields of view of first and second cameras in consolidated 2D/3D camera. The camera is considered "consolidated" because the first camera provides both a 2D image and one image of a 3D (stereoscopic) image pair. Thus the previously-required separate 2D camera has been consolidated into one of the 3D cameras. In the example of FIG. 2 and all subsequent examples, the first camera, which provides both a 2D and 3D image, is the left camera and the second camera is the right camera. The roles of the left and right cameras may be reversed.

The right camera, which may be the right camera 110R with the right lens 112R, may capture an image over a right field of view 230R determined by an active area of a right image sensor within the right camera and the focal length, or zoom, of the associated right lens. Similarly, the left camera, which may be the left camera 110L with the left lens 112L, may capture an image over a left field of view 230L determined by an active area of a left image sensor within the left camera and the focal length of the associated left lens. The left and right image sensors may be the same type and the focal length of the left and right lenses may be the same. In this case, as shown in FIG. 2, the right field of view 230R and the left field of view 230L may be the same size and the images captured by the left and right cameras may have the same resolution. However, the type and/or size of the image sensors and/or the focal lengths of the left and right lenses may be different, such that the left and right fields of view are not necessary the same size and do not necessarily have the same resolution.

A first portion of the field of view 230L of the left camera may be extracted from the image captured by the left camera to provide a 2D image frame 234. A second portion of the field of view 230L may be extracted from the image captured by the left camera to provide a left 3D image frame 232L. The 2D image frame 234 and the left 3D image frame 232L may be different in at least one of size, position within the field of view 230L, and resolution. The sizes of the left 3D image frame 232L and the 2D image frame 234 may be independently established by a digital zoom within the total field of view 230L of the left camera. Either of the 2D image frame 244 or the left 3D image frame 232L may encompass the entire field of view 230L of the left camera. The left 3D image frame 232L may typically, but not necessarily, be larger than and encompass the 2D image frame 234. The left 3D image frame 232L and the 2D image frame 234 may be centered horizontally within the field of view 230L of the left camera, as shown in FIG. 2, or either or both of the left 3D image frame 232L and the 2D image frame 234 may be de-centered. The left 3D image frame 232L and the 2D image frame 234 may typically, but not necessarily, be offset vertically, as shown in FIG. 2.

All or a portion of the field of view 230R of the right camera may be extracted from the image captured by the right camera to provide a right 3D image frame 232R. The right 3D image frame 232R may encompass the same, or nearly the same as field of view as the left 3D image frame 232L, such that the left 3D image frame 232L and the right 3D image frame 232R provide a stereo image pair. The sizes and relative positions of the left 3D image frame 232L and the right 3D image frame 232R within the respective camera fields of view 230L, 230R may be the same.

The vertical extent of the fields of view of left and right cameras 230L, 230R may be identical. However, in a real camera, the vertical extent of the fields of view 230L, 230R may not match perfectly over the entire range of lens focal lengths and focus distances. The relative positions of the right 3D image frame 232R and the left 3D image frame 232L may be offset vertically if necessary to compensate for lack of registration between the left and right fields of view 230L, 230R. The vertical offset may be determined from a calibration procedure, or may be determined dynamically based on analysis of the images captured by the left and right cameras. In addition, as will be described subsequently, the relative positions of the right 3D image frame 232R and the left 3D image frame 232L may be offset horizontally to adjust the apparent depth of the stereo image pair.

When capturing an event, a cameraman may control the pan and tilt (i.e. the physical pointing angles) of the consolidated 2D/3D camera and provide a zoom input to define the desired framing of either the 2D image or the 3D image. The cameraman may also control the focus distance of the lenses of the left and right cameras, or the focus distance of the left and right cameras may be set by an autofocus system or by an assistant cameraman (commonly termed the "focus puller"). For example, the cameraman may define the desired 2D image framing and the framing of the 3D image may be set automatically based on the desired 2D framing. Alternatively, the cameraman may define the desired 3D image frame and the 2D image framing may be set automatically based on the desired 3D framing. In either case, the relationship between the 3D image framing and the 2D image framing may be determined by a fixed proportionality constant, a formula, a look-up table, or some other technique for mapping a 2D image frame to a corresponding 3D image frame. The relationship between the 3D image framing and the 2D image framing may depend on, for example, the focus distance and/or the focal length set for the lenses of the left and right cameras.

To ensure that the extracted 2D and 3D images frames 234, 232L have sufficient resolution, the resolution of the left camera may be substantially higher than the desired resolution of the 2D image frame 234 and the left 3D image frame 232L. For example, the 2D image frame 234 may conform to a conventional HDTV format such as 1080i or 1080p and the total resolution of the left camera may be 2160×4096 pixels or 2500×4500 or some other resolution. The resolution of the image sensor within the right camera and the image sensor within the left camera may be the same or different.

Figure 3:
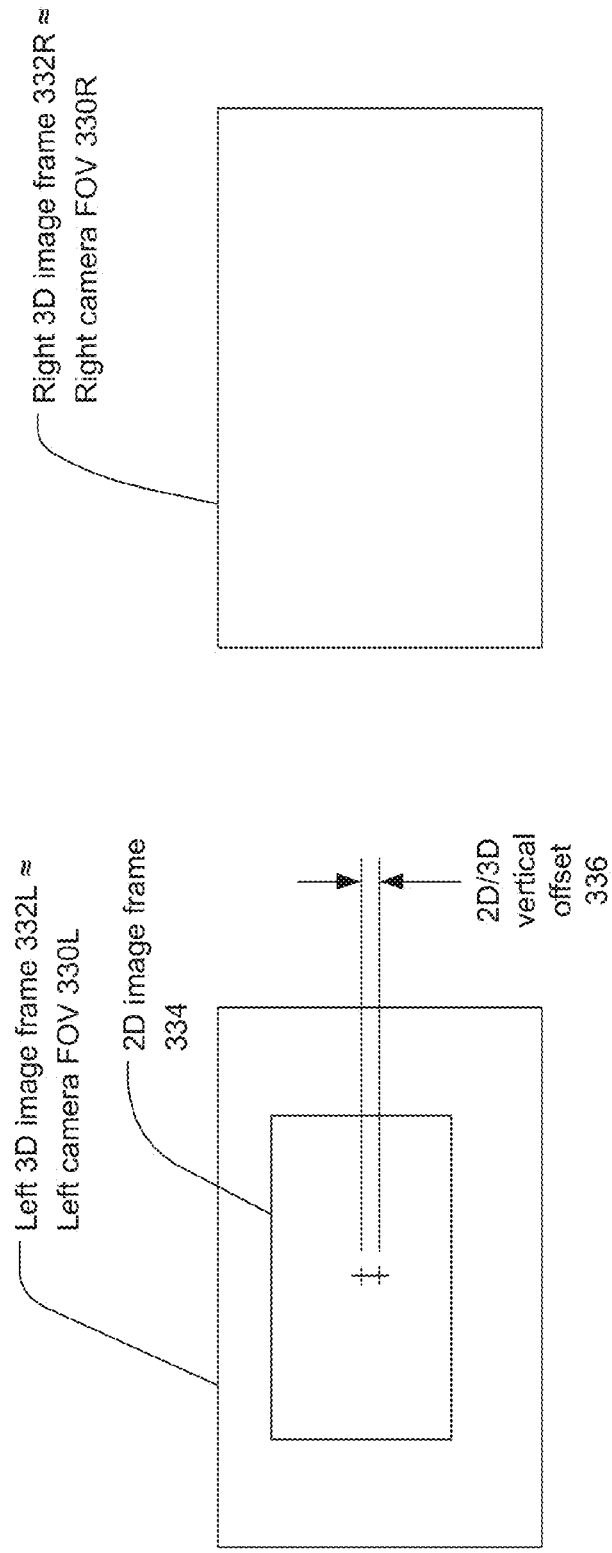
FIG. 3 is a graphical representation of the fields of view of two cameras.

FIG. 3 a graphical representation of the fields of view of left and right cameras in an exemplary consolidated 2D/3D camera. In this example, a 2D image frame 334 is extracted from the image captured by a left camera. Alternatively, the 2D image frame may be extracted from the image captured by a right camera (not shown). In this example, the 2D image frame 334 may be completely contained within the corresponding 3D image frame 332L. The framing of one of the 2D image and the 3D image may be defined by a cameraman, and the framing of the other of the 2D image and the 3D may determined automatically. In either case, the focal length of the lenses of the left and right cameras may be automatically set such that the left and right 3D image frames 332L, 332R occupy most or all of the fields of view of the respective left and right cameras 330L, 330R.

As shown in FIG. 3, the left 3D image frame 332L may include all or nearly all of the field of view 330L of the left camera, and the right 3D image frame 332R may include all or nearly all of the field of view 330R of the right camera. The left and right 3D image frames 332L, 332R may be slightly smaller than the respective fields of view 330L, 330R to allow adjustment of the relative position of each 3D image frame. For example, the relative position of one or both of the 3D image frames 332L, 332R may be adjusted within the field of view of the respective camera to compensate for imperfect vertical registration of the fields of view 330L, 330R or to adjust the apparent depth of the stereo image pair.

The relative extents of the 2D image 334 frame and the 3D image frames 332L, 332R may be determined as previously described. The 2D image frame 334 may typically be centered horizontally within the field of view 330L. The 2D image frame 334 may be offset vertically within the field of view 330L by a 2D/3D vertical offset distance 336. The 2D/3D vertical offset distance 336 may be set automatically based on, for example, the focus distance and/or the focal length set for the lenses of the left and right cameras. The 2D/3D vertical offset distance 336 may be determined by a fixed proportionality constant, a formula, a look-up table, or some other technique.

To ensure that the extracted 2D image frame 334 has sufficient resolution, the resolution of the left camera may be substantially higher than the desired resolution of the 2D image frame 334. For example, the 2D image frame 334 may conform to a conventional HDTV format such as 1080i or 1080p and the total resolution of the left camera may be 2160×4096 pixels or 2500×4500 or some other resolution. The resolution of the image sensor within the right camera and the image sensor within the left camera may be the same or different.

Figure 4:
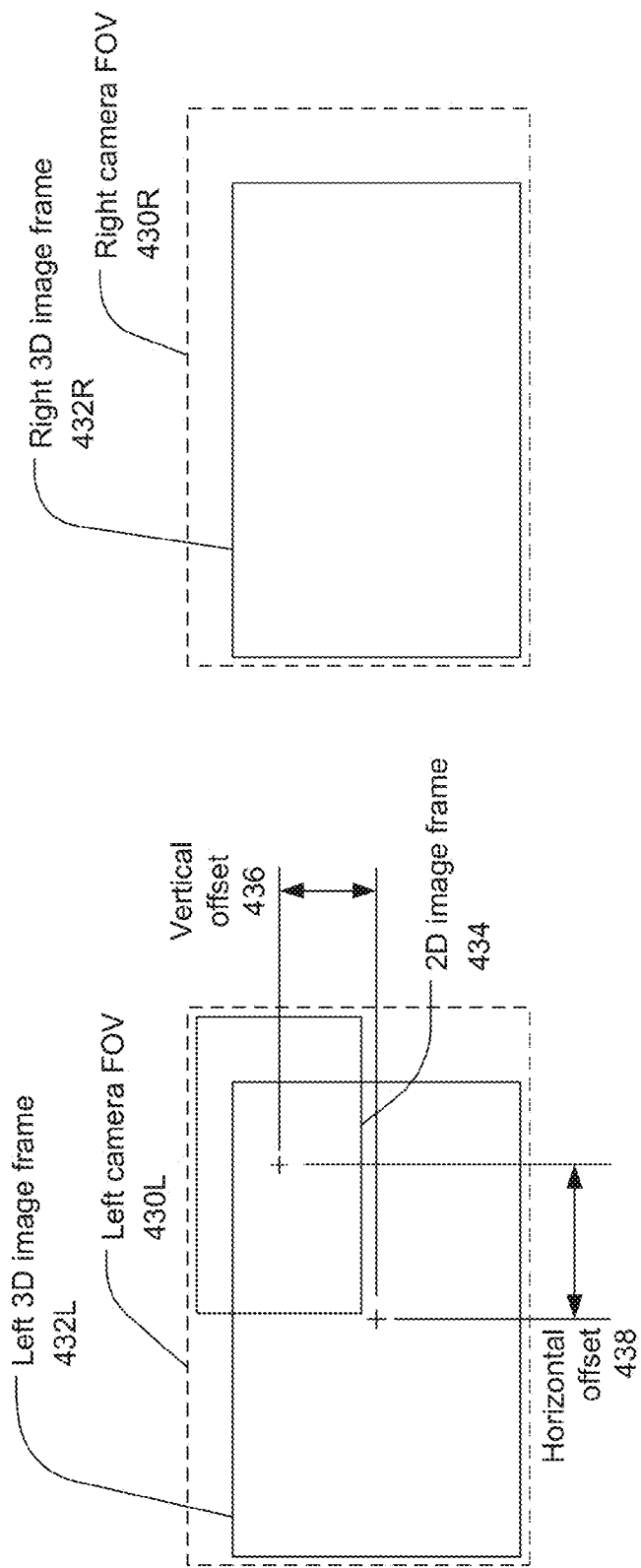
FIG. 4 is a graphical representation of the fields of view of two cameras.

FIG. 4 a graphical representation of the fields of view of left and right cameras in an exemplary consolidated 2D/3D camera in which the 2D image framing and the 3D image framing may be set independently. As in previous examples, a 2D image frame 434 is extracted from the image captured by a left camera. A primary cameraman may control the pan and tilt (i.e. the physical pointing angles) of the camera and provide a zoom input to define the desired framing of either the 2D image or the 3D image. The framing of the other one of the 2D image or the 3D image may be controlled by a second operator such as a recording engineer or stereographer. In this case, the 2D image frame 434 may be larger than, smaller than, or the same size as the 3D image frame 432L. The centers of the 2D image frame 434 and the 3D image frame 432L may be collocated or displaced by a vertical offset 436 and/or a horizontal offset 434. Further, the 2D image frame 434 and the 3D image frame 432L may not overlap completely.

In the case where the 2D image frame 434 and the 3D image frame 432L do not overlap completely, the field of view 430L of the left camera may be sized and positioned to encompass both the 2D image frame 434 and the left 3D image frame 432L. In this case, a controller or control processor may receive operator inputs defining the sizes and relative position of the desired 2D and 3D image frames, determine the required field of view 430L to encompass both the 2D and 3D image frames, and set the focal length (zoom) of the lens of the left camera accordingly. The controller may define the respective portions of the left field of view 430L to be extracted as the 2D image frame 434 and the left 3D image frame 432L.

When the size of the image sensors with the left and right camera are identical, the controller may also set the lens of the left and right cameras to the same focal length, such that the right camera captures a field of view 430R which is, or is nearly, coextensive with the left field of view 430L. The controller may define a portion of the right field of view 430R to be extracted as the right 3D image frame 432R.

Figure 5:
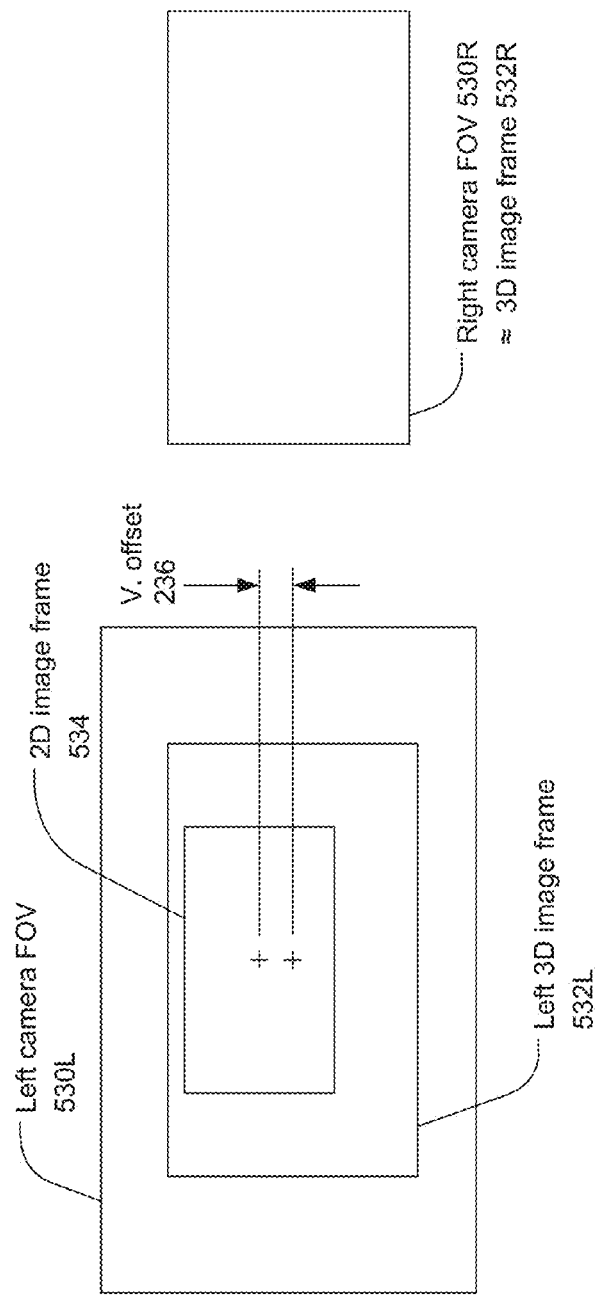
FIG. 5 is a graphical representation of the fields of view of two cameras.

FIG. 5 a graphical representation of the fields of view of left and right cameras in an exemplary consolidated 2D/3D camera which is also asymmetric in that a left camera and a right camera differ in at least one of size of respective image sensors within the left and right cameras, resolutions of the respective image sensors within the left and right cameras, and/or the focal lengths of the lenses of the left and right cameras. Further, the respective fields of view 530L, 530R of the left and right cameras are not necessarily coextensive. As in previous examples, the left camera captures the left field of view 530L from which a left 3D image frame 532L and a 2D image frame 534 may be extracted. The right camera captures the right field of view 530R which may be equivalent to the right 3D image frame 532R. The roles of the left and right cameras may be reversed.

To ensure that the extracted 2D image frame 534 has sufficient resolution, the resolution of the left camera may be substantially higher than the desired resolution of the 2D image frame 534. For example, the 2D image frame 534 may conform to a conventional HDTV format such as 1080i or 1080p and the total resolution of the left camera may be 2160×4096 pixels or 2500×4500 or some other resolution. The resolution of the image sensor within the right camera may be substantially less that the resolution of the image sensor within the left camera. For example, the resolution of the right camera may be equal to the desired resolution of the right 3D image frame 532R.

Figure 6:
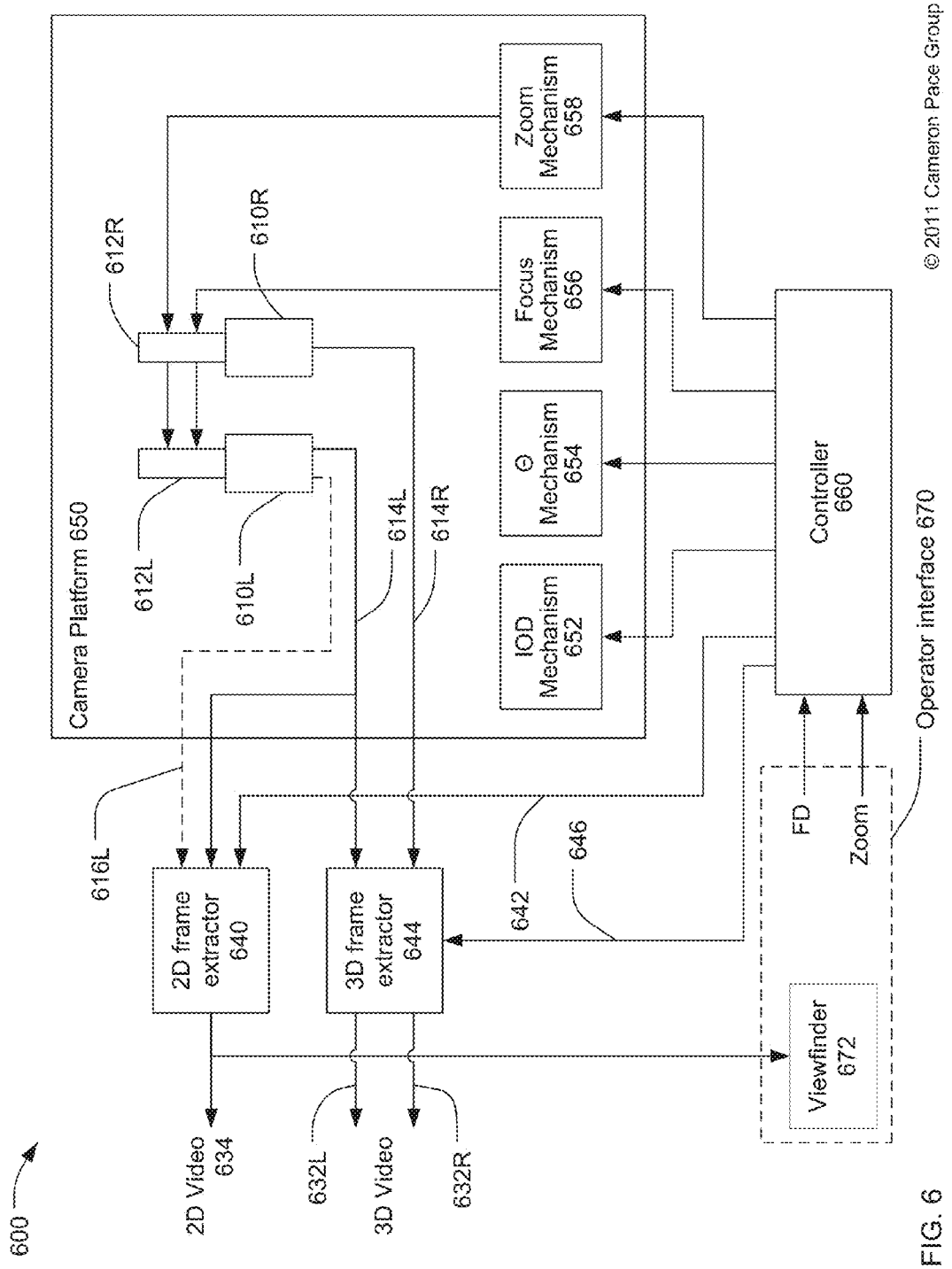
FIG. 6 is a block diagram of a consolidated 2D/3D camera.

Referring now to FIG. 6, an exemplary consolidated 2D/3D camera system 600 may include a camera platform 650 coupled to a controller 660, which is in turn coupled to an operator interface 670. The camera platform 650 may include a left camera 610L and a right camera 610R, each of which has an associated lens 612L, 612R.

The camera platform 650 may include a plurality of mechanisms to adjust the position and/or orientation of the left and right cameras 610L, 610R and the configurations of the left and right lenses 612L, 612R. In this patent, the term "mechanism" refers to a combination of mechanical, electrical, and electromechanical components including at least one component movable with respect to other components and an actuator which causes relative motion of the movable component. The relative motion may be linear, angular, a combination or linear and angular, or some other movement. The movable components may be coupled by rotary or linear slides, bearings, bushings, or other devices. The actuator may be a motor or a manually operated lever, knob, crank, ring, or other device. The actuator may be all or a portion of one of the movable components, or may be coupled to the movable components by way of one or more gears, belts, links, and other devices. Examples of mechanisms include motorized linear or rotational motion stages and manual or motorized systems currently used to adjust focus and aperture on cinematic camera lenses The camera platform 650 may include an IOD mechanism 652 to adjust an interocular distance between the left camera 610L and the right camera 610R. The camera platform 650 may include a Θ mechanism 654 to adjust a stereo convergence angle between the left camera 610L and the right camera 610R by pivoting one or both cameras about respective pivot axes. The IOD mechanism 652, and the Θ mechanism 654 may include one or more movable platforms or stages coupled to motors or other actuators. The IOD mechanism 652 and the Θ mechanism 654 may be adapted to set the interocular distance and the stereo convergence angle, respectively, in response to data received from the controller 660. Within this patent, the term "data" is intended to include digital data, commands, instructions, digital signals, analog signals, optical signals and any other data that may be used to communicate the value of a parameter such as interocular distance or convergence angle.

The camera platform 650 may include a focus mechanism 656 to adjust and set the focus distance of the lenses 612L, 612R. The focus mechanism 656 may include a mechanical, electronic, electrical, or electro-mechanical linkage between the lenses 612L, 612R to simultaneously adjust the focus distance of both lenses to the same value. The focus mechanism 656 may include a motor or other actuator adapted to set the focus distance in response to data received from the controller 660. The focus mechanism of either the left lens 612L or the right lens 612R may be manually controlled by an operator such as a cameraman or focus puller. When the focus of one lens is manually controlled, the focus mechanism 656 may include an encoder, potentiometer, or other sensor to provide data indicating the focus distance of the manually controlled lens to the controller 660. The controller may then provide data to the focus mechanism 656 to set the other lens (the lens that is not manually controlled) to the same focus distance. The focus distance of the left and right lenses 612L, 612R may be set in accordance with an operator input via the operator interface 670. The focus distance of the left and right lenses 612L, 612R may be set in accordance with an autofocus subsystem (not shown) that senses a distance to a primary object within a scene being recorded.

The camera platform 650 may include a zoom mechanism 658 to adjust and set the focal lengths of the lenses 612L, 612R. The zoom mechanism 658 may include independent motors or other actuators adapted to set the focal lengths of the left lens 612L and the right lens 612R in response to data received from the controller 660. The zoom of either the left lens 612L or the right lens 612R may be manually controlled by an operator such as a cameraman or assistant cameraman. When one lens is manually controlled, the zoom mechanism 658 may include an encoder, potentiometer, or other sensor to provide data indicating the focal length of the manually controlled lens to the controller 660. The controller may then provide data to the zoom mechanism 658 to adjust the focal length of the other lens (the lens that is not manually controlled) based on the focal length of the manually controlled lens. Since the fields of view of the left and right cameras 612L and 612R may be different, the focal lengths of the left and right lenses 612L and 612R may be set independently, which is to say the focal lengths are not necessarily set to the same value.

The controller 660 may be separate from or included within, at least in part, the camera platform 650. The controller 660 may be coupled to an operator interface 670. The operator interface 670 may be physically separate from the camera platform 650 and the controller 660, or may be partially or wholly incorporated into the camera platform 650 and/or the controller.

The operator interface may include a control to allow an operator such as a cameraman and/or an assistant cameraman to set a desired common focus distance (FD). In this case, the operator interface may provide data to the controller 660 indicating the manually-set common focus distance. The controller 660 may then provide data to the focus mechanism 656 on the camera platform 650 to set the focus distance of the lenses 612L, 612R to the desired common focus distance. The controller 660 may also send data to the 0 mechanism 654 to automatically adjust the stereo convergence angle to set a convergence distance based on the common focus distance.

The operator interface 670 also may be used to control the focal lengths of the left and right lenses 612L, 612R. The operator interface 670 may include a zoom control to allow an operator such as a cameraman and/or an assistant cameraman to set a desired image frame for one of the 2D image and the 3D image, and thus indirectly control the focal length of the left and right camera lenses 612L, 612R. For example, the operator may use the zoom control to indicate a desired framing of the 2D image. In this case, the controller 660 may automatically determine the desired framing of the 3D image based on the 2D image framing using a proportionality constant a formula, a lookup table, or some other technique. Alternatively, the operator may use the zoom control to indicate the desired 3D image framing and the controller may automatically determine the desired 2D image framing. In either case, the controller may then automatically determine appropriate focal lengths for the left lens 612L and the right lens 612R to accommodate both the desired 2D image frame and the desired 3D image frame. The controller may provide data to the zoom mechanism 658 to set the focal length of the left lens 612L and the focal length of the right lens 612R to provide the desired 2D image frame and 3D image frame.

As in previous examples, FIG. 6 presumes that a 2D image frame is extracted from the image captured by the left camera. A 2D frame extractor 640 may extract the 2D image frame from video data 614L output from the left camera 610L. For example, the 2D frame extractor 640 may extract the 2D image frame from the total fields of view of the left camera as illustrated in FIG. 2, FIG. 3, FIG. 4, or FIG. 5. The 2D frame extractor 640 may output 2D video data 634 in a format, such as a conventional 1080i, 1080p, or 720p high definition video format, suitable for 2D recording and/or broadcasting.

The 2D frame extractor 640 may, for example, receive video data 614L from the left camera 610L and store a portion, corresponding to the 2D image frame, of the video data 614L in a 2D frame buffer memory (not shown). The 2D video data 634 may then be read from the 2D frame buffer memory. The 2D frame buffer memory may include two or more banks, such that video data 614L for a current frame may be stored in a first bank of the 2D frame buffer memory while 2D video data 634 for a previous frame is read from a second bank of the 2D frame buffer memory.

The 2D image frame extracted by the 2D frame extractor 640 may be centered horizontally within the total field of view of the left camera 610L. The 2D image frame extracted by the 2D frame extractor 640 may be centered vertically within the total field of view of the left camera 610L, or may be de-centered in accordance with vertical offset data 642 provided by the controller 660. The controller may determine a desired vertical offset automatically based on the focus distance and focal lengths of the left and right lenses. Alternatively, the vertical offset may be set manually by the cameraman or another operator.

The 2D video data 634 output from the 2D frame extractor 640 may be provided to an electronic viewfinder 672 included in the operator interface 670. The viewfinder 672 may be or include a display such as a liquid crystal display. The cameraman may use the image displayed on the viewfinder 672 to guide in the operation of the consolidated 2D/3D camera 600.

A 3D frame extractor 644 may extract left 3D video data 632L from video data 614L output from the left camera 610L, and may extract right 3D video data 632R from video data 614R output from the right camera 610R. For example, the 3D frame extractor 644 may extract the left and right 3D video data from the total fields of view 230L, 230R of the left and right cameras as illustrated in FIG. 2, FIG. 3, FIG. 4, or FIG. 5. The 3D frame extractor may output left 3D video data 632L and right 3D video data 632R in a format, such as a conventional 1080i, 1080p, or 720P high definition video format, suitable for 3D recording and/or broadcasting.

The 3D image frame extracted by the 3D frame extractor 644 may be centered horizontally and vertically within the total field of view of the left camera 610L. The extent of the 3D image frame extracted by the 3D frame extractor 644 may be controlled by 3D frame size data 646 provided by the controller 360.

The 3D frame extractor 644 may, for example, receive video data 614L, 614R from the left camera 610L and right camera 610R, respectively, and store a portion, corresponding to the 3D image frame, of the video data in a 3D frame buffer memory (not shown). The 3D video data 632L, 632R may then be read from the 3D frame buffer memory. The 3D frame buffer memory may include two or more banks, such that video data 614L, 614R for a current frame may be stored in a first bank of the 3D frame buffer memory while 3D video data 632L, 632R for a previous frame is read from a second bank of the 3D frame buffer memory.

The portion of the total field of view of the left camera and/or the portion of the field of view of the right camera that is extracted by the 3D frame extractor 644 may have higher resolution than the desired format of the 3D video data 632L, 632R. The 3D frame extractor 644 may process the extracted portion, before or after the extracted portion is stored in the 3D frame buffer memory, as necessary such that the resolution of the video data 632L, 632R matches the desired format of the 3D video data.

Although shown separately for ease of discussion, the 2D frame extractor 640 and the 3D frame extractor 644 may be integrated and may share elements such as a frame buffer memory. The 2D frame extractor 640 and/or the 3D frame extractor 644 may be physically separate or may be portions of the camera platform 650 and/or the controller 660. The 2D frame extractor 640 and/or the 3D frame extractor 644 may be distributed between the camera platform 650 and the controller 660. The 2D frame extractor 640 and/or the 3D frame extractor 644 may be partially integrated into one or both of the cameras 610L, 610R. For example, the left camera 610L may provide video data 614L for use by 3D frame extractor 644 and different video data 616L for use by the 2D frame extractor 640. The 2D frame extractor 640 and/or the 3D frame extractor 644 may be wholly integrated into the cameras 610L, 610R. In this case the video data 614R output from the right camera 610R may be used directly as the right 3D video data 632R, and the video data 614L, 616L output from the left camera 610L may be used directly as the left 3D video data 632L and the 2D video data 634, respectively.

Figure 7:
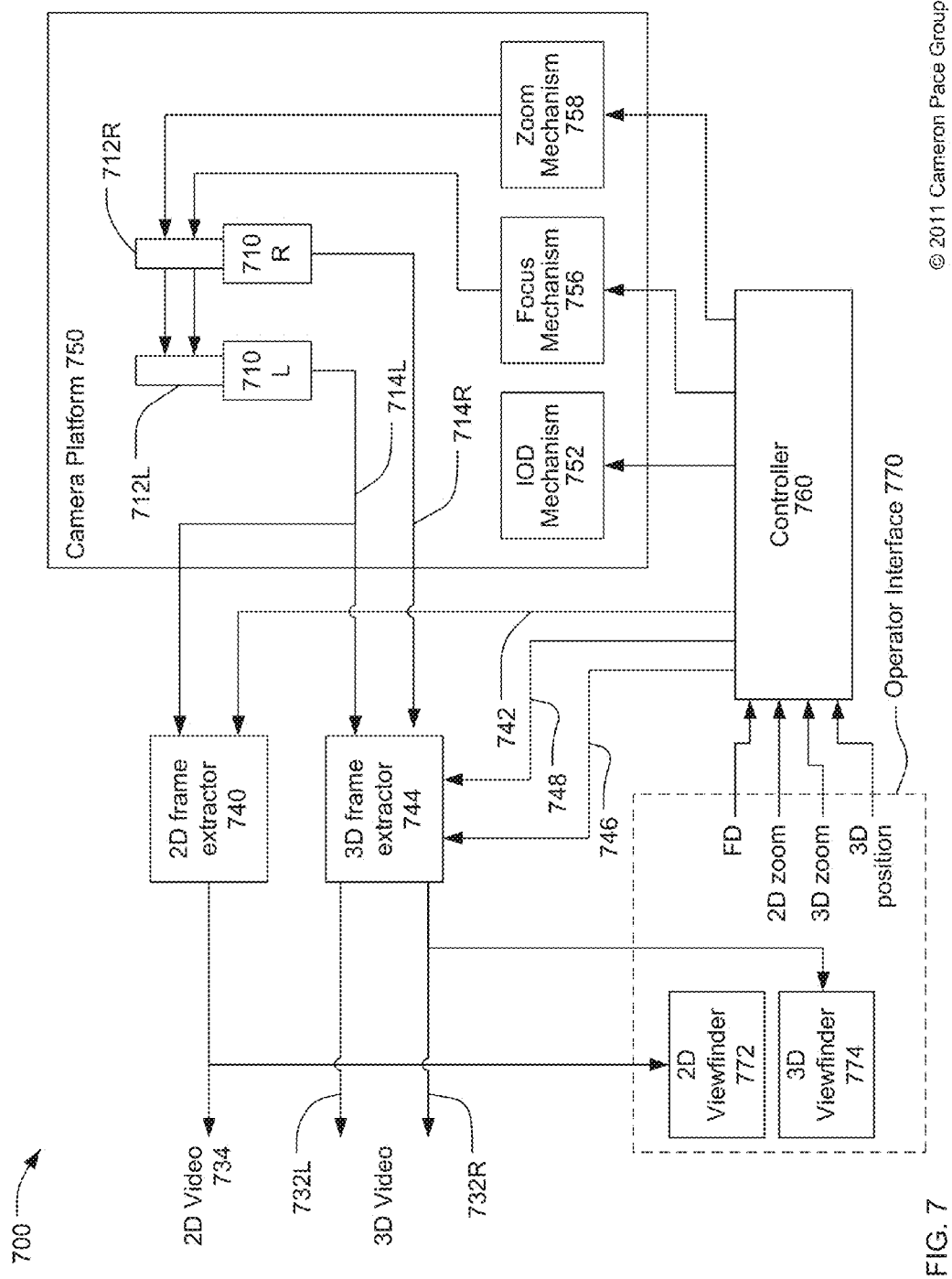
FIG. 7 is a block diagram of another consolidated 2D/3D camera.

Referring now to FIG. 7, another exemplary consolidated 2D/3D camera system 700 may include a camera platform 750 coupled to a controller 760, which is in turn coupled to an operator interface 770. Many elements of the consolidated 2D/3D camera system 700 function in the same manner as the counterpart elements of the consolidated 2D/3D camera system 600. Descriptions of elements having identical functions will not be repeated.

In contrast to the camera platform 650, the camera platform 750 does not include a convergence mechanism. In lieu of a convergence mechanism, one or both of the left 3D image frame and the right 3D image frame extracted by the 3D frame extractor 744 may be movable horizontally within the total field of view of the respective camera. The relative horizontal positions of the left 3D image frame and the right 3D image frame within the total field of view of the respective cameras may be controlled by horizontal offset data 748 provided by the controller 760. The controller may determine desired positions of the left 3D image frame and the right 3D image frame automatically based on the focus distance set for left and right lenses 710L, 710R. Moving the relative positions of the left 3D image frame and the right 3D image frame within the fields of view of the respective cameras 710L, 710R may have a similar effect to mechanically adjusting the convergence angle between the left and right cameras 710L, 710R. Although not shown in FIG. 6 and FIG. 7, a consolidated 2D/3D camera may include both a convergence mechanism, such as the Θ mechanism 654, and a 3D frame extractor with the capability to horizontally position one or both of the left 3D image frame and the right 3D image frame, such as the 3D frame extractor 744.

The operator interface 770 may include both a 2D zoom control and a 3D zoom control to allow one or more operators to set a desired image frame for a 3D image independently of the 2D image frame. In this case, the operator interface 770 may include a 3D viewfinder 774 in addition to a 2D viewfinder 772. The 3D viewfinder 774 may guide the operator to set the desired 3D image frame. When both the 2D viewfinder 772 and the 3D viewfinder 774 are present, the operator interface 770 may be distributed such that a first operator, such as a cameraman, may view the 2D viewfinder and control the 2D focus distance (FD), the 2D zoom, and the pan and tilt of the camera system. A second operator, who may be in a remote location, may view the 3D viewfinder and control the 3D zoom and, optionally, the relative positions of the 2D and 3D image frames.

The omission of a convergence mechanism and the addition of a 3D viewfinder to the consolidated 2D/3D camera system 700 are independent modifications to the consolidated 2D/3D camera system 600 of FIG. 6. A consolidated 2D/3D camera may include either, both, or none of these modifications.

Figure 8:
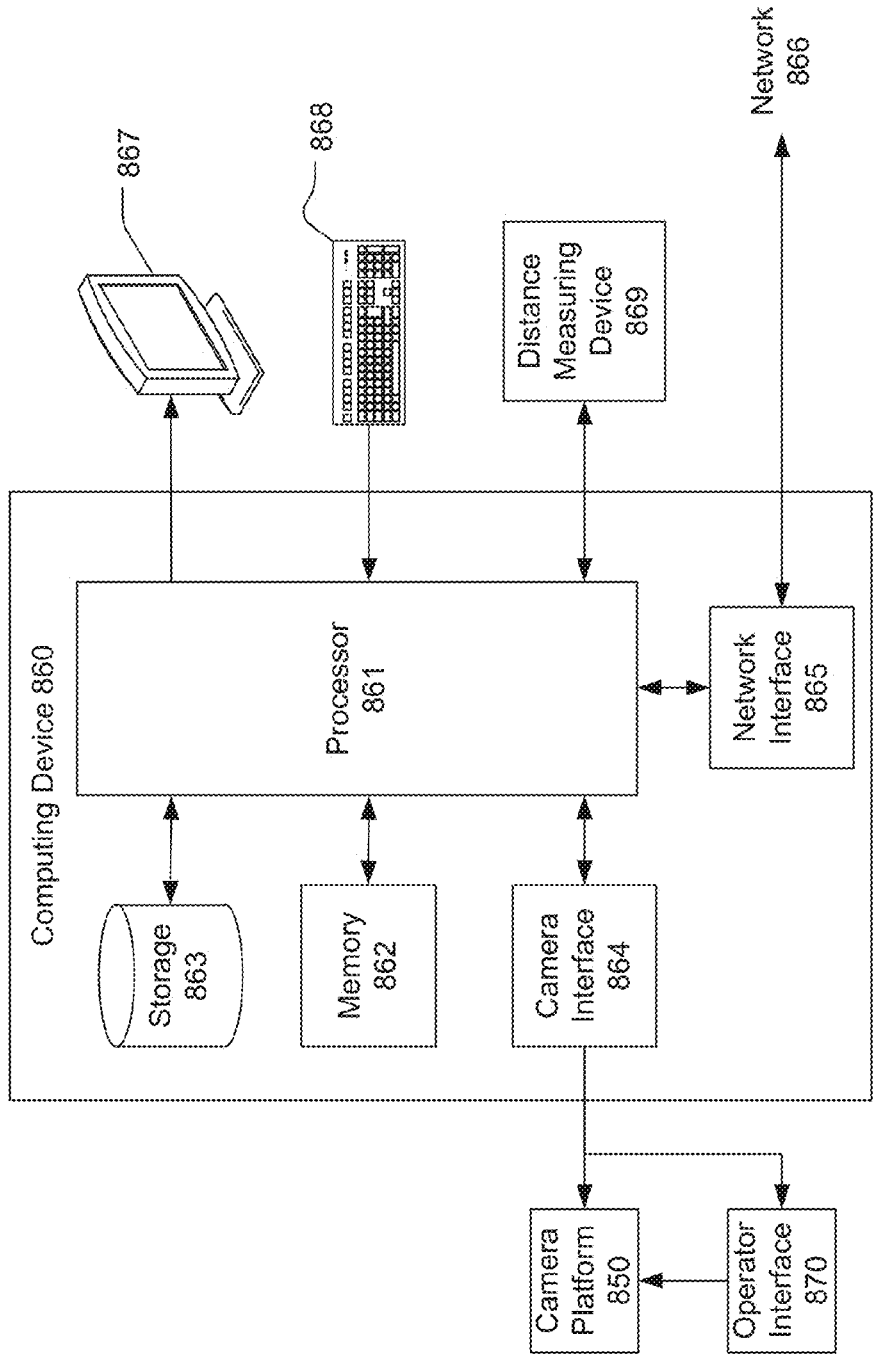
FIG. 8 is a block diagram of a computing device.

FIG. 8 is a block diagram of a computing device 860 that may be suitable for the controller 660 or 760. As used herein, a computing device refers to any device with a processor, memory and a storage device that may execute instructions including, but not limited to, personal computers, server computers, computing tablets, video game systems, personal video recorders, smart phones, and laptop computers. The computing device 860 may include hardware augmented by firmware and/or software adapted to perform the processes subsequently described herein. The computing device may include a processor 861 coupled to a memory 862 and a storage device 863.

The storage device 863 may store instructions which, when executed by the computing device 860, cause the computing device to provide the features and functionality of the controller 660 or 760. As used herein, a storage device is a device that allows for reading from and/or writing to a storage medium. Storage devices include hard disk drives, DVD drives, flash memory devices, and others. Each storage device may accept a storage media. In this patent, the term "storage media" refers a physical object for storing data, and does not include transitory media such as propagating signals and waveforms. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 860 may include or interface with a display device 867 and one or more input devices such a keyboard 868. The computing device 860 may also include a network interface unit 865 to interface with one or more networks 866. The network interface unit 865 may interface with the network 866 via a wired or wireless connection. The network 866 may be the Internet or any other private or public network.

The computing device 860 may also include a camera interface unit 864 to interface with a camera platform 850, which may be the camera platform 650 or 750, and an operator interface 870, which may be the operator interface 670 or 770. The camera interface unit 864 may be coupled to the camera platform 850 and the operator interface 870 via a network, which may be a local area network or a wireless network; via one or more buses such as a USB bus, a PCI bus, a PCI Express bus, or other parallel or serial data bus; via one or more direct wired or wireless connections; or via a combination of two or more of direct connections, network connections, and bus connections. The camera interface unit 864 may include circuits, firmware, and/or software necessary to interface with the camera platform 850 and the operator interface 870.

The processes, functionality and features of the computing device 860 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 860 may run one or more software programs as previously described and may run an operating system, including, for example, versions of the Linux, Unix, Microsoft Windows, Android, and Apple Mac OS operating systems. The hardware and software and their functions may be distributed such that some functions are performed by the processor 861 and others by other devices.

Description of Processes

Figure 9:
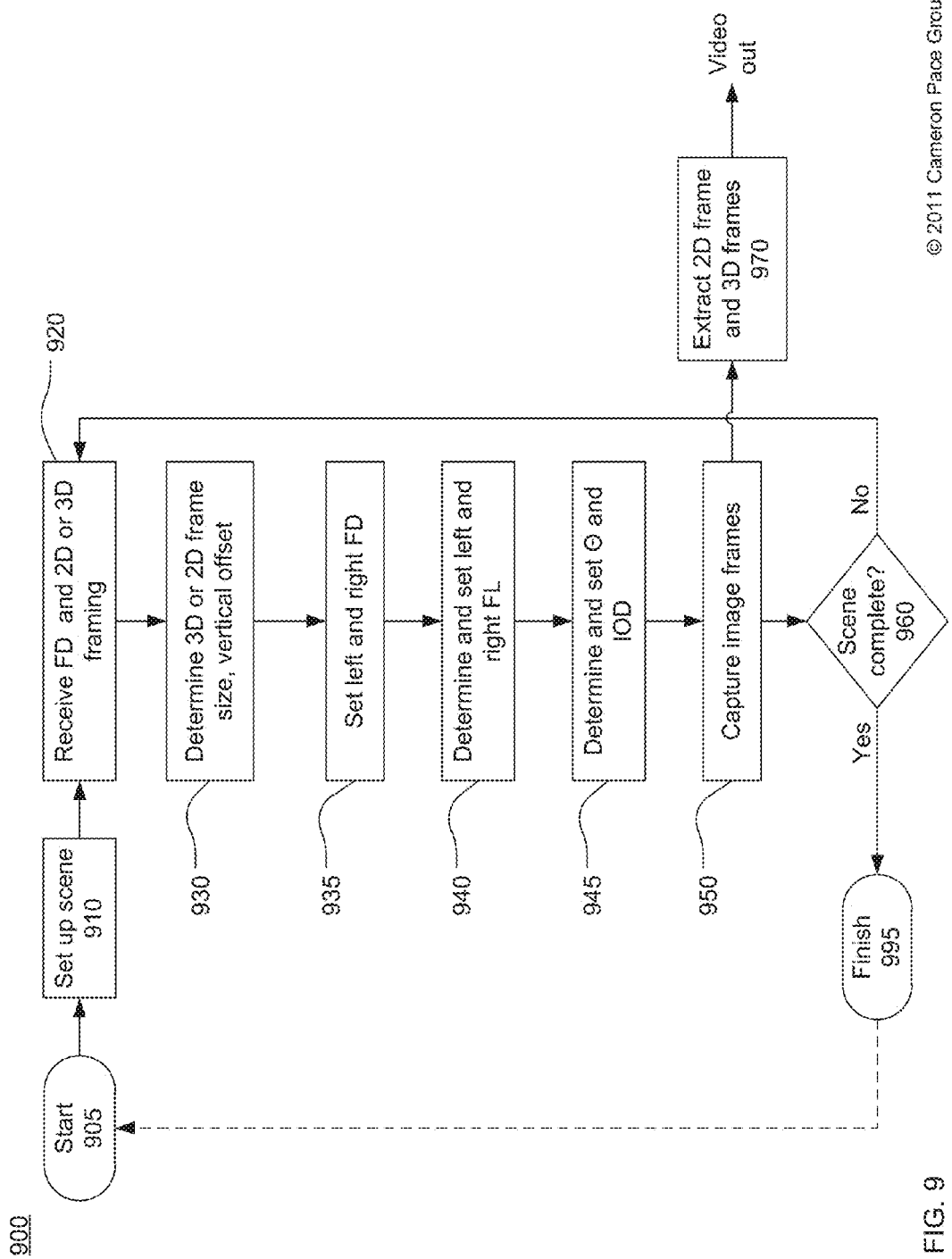
FIG. 9 is a flow chart of a process for operating a consolidated 2D/3D camera.

FIG. 9 is a flow chart of an exemplary process 900 for simultaneously recording 2D and 3D images using a consolidated 2D/3D camera such as the consolidated 2D/3D camera 600. Specifically, FIG. 9 is a flow chart of a process for recording a scene. The flow chart has a start 905 and a finish at 995 when the recording of the scene is complete. As indicated by the dashed line from 995 to 905, the process 900 may be repeated for each of a large plurality of scenes that may constitute, for example, a motion picture or television program. In the case of a live sporting or other event, the entire event may be recorded as a single scene with a single setup. The process 900 is continuous in nature and the actions 920-960 within the process 900 may be performed continuously and in near-real time during the recording of each scene. Although shown as sequential actions for ease of explanation, the actions 920-960 may be performed concurrently. The action at 970 may be performed concurrent with the actions 920-960 in near-real time and/or during post processing of the captured scene.

Within this patent, the phrase "near-real time" means in real time except for processing delays that are very short compared with temporal events in the scene being recorded.

The term "concurrently" means within the same time period, but not necessarily simultaneously.

Consistent with the rest of this specification, the following description of the process 600 presumes that the consolidated 2D/3D camera system includes left and right cameras including respective left and right lens.

At 910 the scene and at least one camera to be used to record the scene may be set up. Setting up the scene may include positioning one or more cameras and mapping distances from each camera to locations within the scene. Setting up the scene may also include determining the desired relationships between 3D image frames and 2D image frames. Relative 2D and 3D image frame size and vertical offset may be determined, for example, as functions of focus distance and 2D zoom. Setting up the scene may include defining proportionality constants, formulas, lookup tables, or other methods to determine a desired 3D frame size and vertical offset from 2D focus distance and focal length information.

To begin recording the scene, at 920, information defining a desired focus distance and a desired framing of either the 2D image or the 3D image may be received by the consolidated 2D/3D camera. This information may be received from an operator, such as a cameraman or assistant cameraman, via an operator interface such as the operator interface 670 or 770.

At 930 the framing of the other of the 2D image or the 3D image may be determined automatically based on the information received at 920. For example, information indicating a desired 2D image framing may be received at 920 and a desired 3D image framing may be automatically determined at 930. Alternatively, information indicating the desired 3D image framing may be received at 920 and the desired 2D image framing may be automatically determined at 930. In either case, the relationship between the 2D and 3D image frames may be determined by proportionality constant, a lookup table, a formula or some other technique.

At 930, a vertical offset, and, optionally, a horizontal offset may also be determined. The vertical offset may be a fixed amount or a fixed portion of a height of the 2D frame or the 3D frame, or may be determined from the focus distance information received at 920. The vertical offset may be determined from the focus distance and/or the 2D or 2D frame size using a formula, a lookup table, or some other method defined at 910. Also at 930, a horizontal offset may be determined based on the focus distance information received at 920. Determining a horizontal offset is optional and may be unnecessary if convergence angle will subsequently be set mechanically at 945.

At 935, the focus distances of the left lens and the right lens may be set to the same distance in accordance with the information received at 920.

At 940 the focal lengths of the left lens and the right lens may be set such that the fields of view of the left and right cameras encompass the 2D and 3D image frames defined at 920 and 930

At 945, a desired convergence angle Θ may be determined based on the common focus distance set at 935. The convergence angle Θ may be determined such that a convergence distance of the consolidated 2D/3D camera is equal to the common focus distance set at 935, is proportional to the common focus distance, is offset from the common focus distance, or is otherwise determined from the common focus distance. The convergence angle Θ may be then set by mechanically rotating one or both of left and right cameras. Mechanical adjustment of the convergence angle is optional. Alternatively, the convergence angle between the left and right cameras may be fixed, and the apparent convergence distance may be adjusted by the horizontal position of the left 3D image frame when it is extracted from the total field of view of the left camera.

Also at 945, after the common focus distance and the focal length of the right lens have been determined, the interocular distance (IOD) may be determined and set. The IOD may be calculated based on the focus distance, the focal length of the right lens, and a predetermined maximum disparity as described in U.S. Pat. No. 7,899,321 B2, entitled Stereo Camera with Automatic Control of Interocular Distance, which is incorporated herein by reference. The IOD may be set by moving one or both of the left and right cameras. Automatically setting the IOD is optional. Alternatively, the IOD may be set manually at 910 and held fixed for the duration of the process 900, or the IOD may be adjusted manually during the process 900.

At 950, an image frame may be captured by each of the left and right cameras. At 970, a 2D image frame and a left 3D image frame may be extracted from the total image captured by the left camera, and a right 3D image frame may be extracted from the image captured by the right camera. The 2D image frame may be horizontally centered within the total image captured by the left camera. The 2D image frame may be vertically positioned within the total image captured by the left camera in accordance with the vertical offset determined at 930. The sizes of the 2D image frame and the left and right 3D image frames may be as determined at 930.

At 960, a determination may be made if the recording of the scene is complete, in which case the process 900 may end at 995. When a determination is made at 960 that the recording will continue, the actions at 920-960 may be repeated continuously and in near-real time until the recording is completed.

Figure 10:
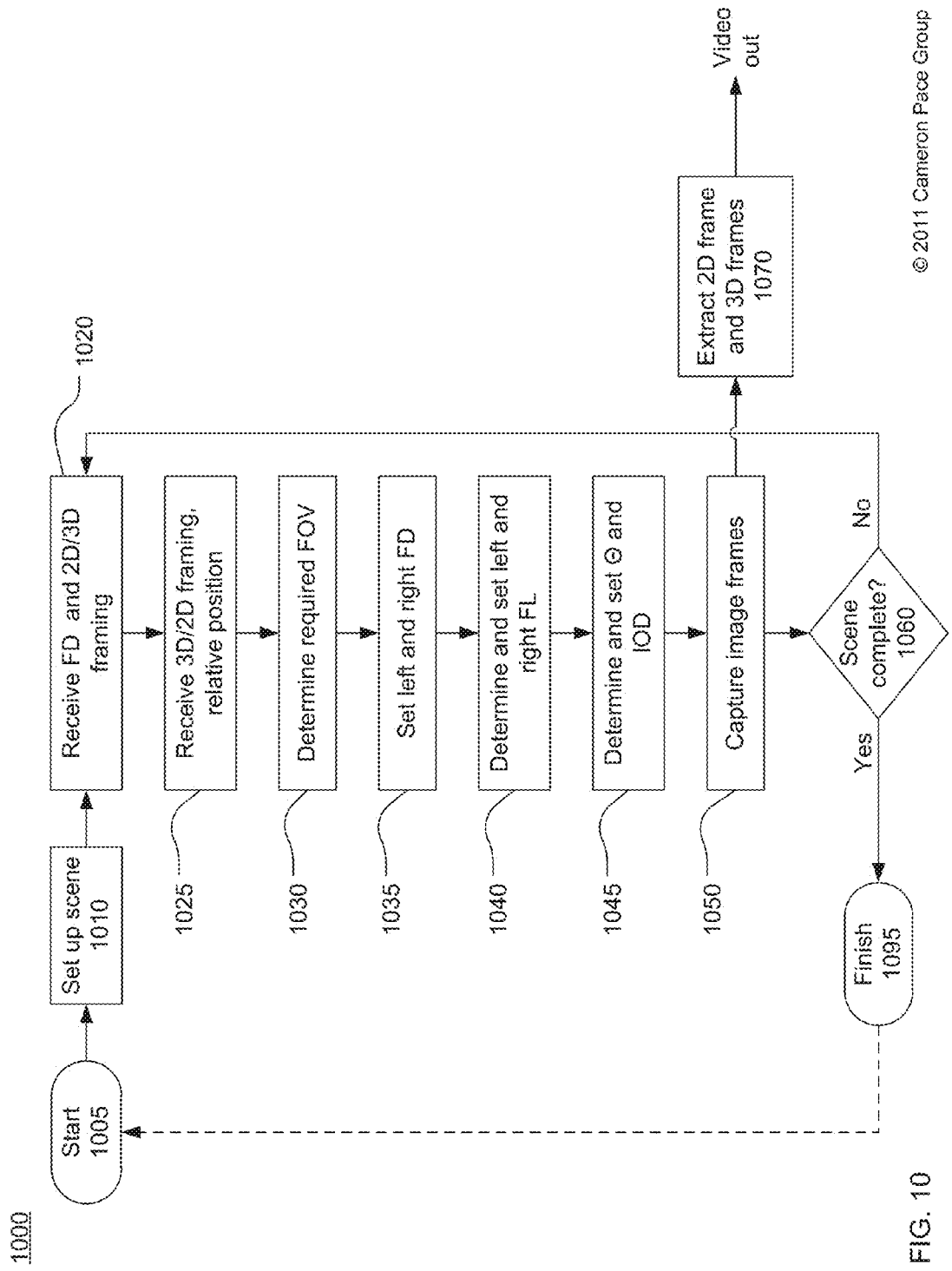
FIG. 10 is a flow chart of another process for operating a consolidated 2D/3D camera.

FIG. 10 is a flow chart of an exemplary process 1000 for simultaneously recording 2D and 3D images using a consolidated 2D/3D camera, such as the consolidated 2D/3D camera 700, in which the framing of a 2D image and a 3D image may be set independently. Many actions within the process 1000 are the same as the counterpart actions in the process 900. Descriptions of essentially identical actions will not be repeated.

To begin recording a scene, at 1020, information defining a desired focus distance FD and a desired framing of either the 2D image or the 3D image may be received by the consolidated 2D/3D camera. This information may be received from a first operator, such as a cameraman or assistant cameraman, who is also responsible for setting the pan and tilt angles of the consolidated 2D/3D camera. This information may be received via an operator interface such as the operator interface 770.

At 1030, information indicating the framing of the other of the 2D image or the 3D image may be received by the consolidated 2D/3D camera, along with information indicating the relative position, within the fields of view of the left and right cameras, of the 2D and 3D image frames. The relative position may be defined, for example, in terms of a vertical offset and/or a horizontal offset between the centers of the 2d image frame and the 3D image frame. This information may be received, for example, from a second operator via the operator interface.

At 1030, required fields of view for the left and right camera may be determined to accommodate both the 2D image framing and the 3D image framing defined at 1020 and 1025.

At 1070, a 2D image frame and a left 3D image frame may be extracted from the total image captured by the left camera, and a right 3D image frame may be extracted from the image captured by the right camera. The sizes and relative positions of the 2D image frame and the left and right 3D image frames may be as determined at 1020 and 1025.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A consolidated 2D/3D camera system, comprising:
   a first camera including a first lens;
   a second camera including a second lens;
   a 3D frame extractor configured to extract a first 3D image frame from an image captured by the first camera and extract a second 3D image frame from an image captured by the second camera to provide a stereo image pair;
   a 2D frame extractor configured to extract a 2D image frame, different from the first 3D image frame, from the image captured by the first camera; and
   a controller coupled to the 3D frame extractor, the 3D frame extractor, and an operator interface, wherein
   an extent of a first one of the 2D image frame and the stereo image pair is defined by a first operator input via the operator interface.

2. The consolidated 2D/3D camera system of claim 1, wherein:
   the controller is configured to automatically determine an extent of a second one of the 2D image frame and the stereo image pair based on, at least in part, the extent of the first one of the 2D image frame and the stereo image pair.

3. The consolidated 2D/3D camera system of claim 2, wherein:
   the extent of the second one of the 2D image frame and the stereo image pair and the extent of the first one of the 2D image frame and the stereo image pair are related by a one of a proportionality constant, a lookup table, and a formula.

4. The consolidated 2D/3D camera system of claim 2, wherein:
   an offset of the second one of the 2D image frame and the stereo image pair with respect to the first one of the 2D image frame and the stereo image pair is determined by a one of a proportionality constant, a lookup table, and a formula.

5. The consolidated 2D/3D camera system of claim 1, wherein:
   an extent of a second one of the 2D image frame and the stereo image pair is defined by a second operator input via the operator interface.

6. The consolidated 2D/3D camera system of claim 5, wherein:
   an offset of the second one of the 2D image frame and the stereo image pair with respect to the first one of the 2D image frame and the stereo image pair is defined by a third operator input via the operator interface.

7. The consolidated 2D/3D camera system of claim 1, further comprising:
   a zoom mechanism to set a field of view of the first camera and a field of view of the second camera; and
   the controller is configured to cause the zoom mechanism to set a field of view of the first camera to encompass the 2D image frame and the first 3D image frame and to set a field of view of the second camera to encompass the second 3D image frame.

8. The consolidated 2D/3D camera system of claim 1, the operator interface comprising:
   a viewfinder to display the 2D image frame extracted by the 2D frame extractor.

9. The consolidated 2D/3D camera system of claim 1, further comprising:
   a focus mechanism to set a focus distance of the first lens and a focus distance of the second lens to a common focus distance in accordance with one of a focus input from an operator via the operator interface and an autofocus system.

10. The consolidated 2D/3D camera system of claim 9, further comprising:
    means to automatically set a convergence distance based on the common focus distance.

11. The consolidated 2D/3D camera of claim 10, wherein the means to automatically set a convergence distance comprises a convergence mechanism to set a convergence angle by rotating one or both of the first camera and the second camera.

12. The consolidated 2D/3D camera of claim 10, wherein the means to automatically set a convergence distance is the 3D frame extractor, the 3D frame extractor configured to set the convergence distance by controlling the horizontal position of one or both of the first 3D image frame and the second 3D image frame within the fields of view of the first camera and the second camera, respectively.

13. A method of operating an consolidated 2D/3D camera system including a first camera having a first lens and a second camera having a second lens, the method comprising:
    capturing a first image with the first camera and a second image with the second camera;
    extracting a first 3D image frame from the image captured by the first camera and a second 3D image frame from the image captured by the second camera to provide a 3D image frame;
    extracting a 2D image frame, different from the first 3D image frame, from the image captured by the first camera; and receiving, via an operator interface, a first operator input defining an extent of a first one of the 2D image frame and the stereo image pair.

14. The method of claim 13, wherein:
automatically determining an extent of a second one of the 2D image frame and the stereo image pair based on, at least in part, the extent of the first one of the 2D image frame and the stereo image pair.

15. The method of claim 14, wherein:
the extent of a second one of the 2D image frame and the stereo image pair and the extent of the first one of the 2D image frame and the stereo image pair are related by a one of a proportionality constant, a lookup table, and a formula.

16. The method of claim 14, further comprising:
automatically determining an offset of the second one of the 2D image frame and the stereo image pair with respect to the first one of the 2D image frame and the stereo image pair using one of a proportionality constant, a lookup table, and a formula.

17. The method of claim 13, further comprising:
receiving, via the operator interface, a second operator input defining an extent of a second one of the 2D image frame and the stereo image pair.

18. The method of claim 17, further comprising:
receiving, via the operator interface, a third operator input defining an offset of the second one of the 2D image frame and the stereo image pair with respect to the first one of the 2D image frame.

19. The method of claim 13, further comprising:
automatically setting a field of view of the first camera to encompass the 2D image frame and the first 3D image frame; and
automatically setting a field of view of the second camera to encompass the second 3D image frame.

20. The method of claim 13, further comprising:
displaying, as a viewfinder, the 2D image frame extracted by the 2D frame extractor.

21. The method of claim 13, further comprising:
receiving a focus input from one of an operator via the operator interface and an autofocus system; and
setting a focus distance of the first lens and a focus distance of the second lens to a common focus distance in accordance with the focus input.

22. The method of claim 21, further comprising:
automatically setting a convergence distance based on the common focus distance.

23. The method of claim 22, wherein automatically setting the convergence distance comprises:
setting a convergence angle by rotating one or both of the first camera and the second camera.

24. The method of claim 22, wherein automatically setting a convergence distance comprises:
adjusting the horizontal position of one or both of the first 3D image frame and the second 3D image frame within the fields of view of the first camera and the second camera, respectively.

* * * * *